Nov. 7, 1950
E. L. FLOOD
2,529,249
SAW LUBRICANT HOLDER
Filed July 12, 1946
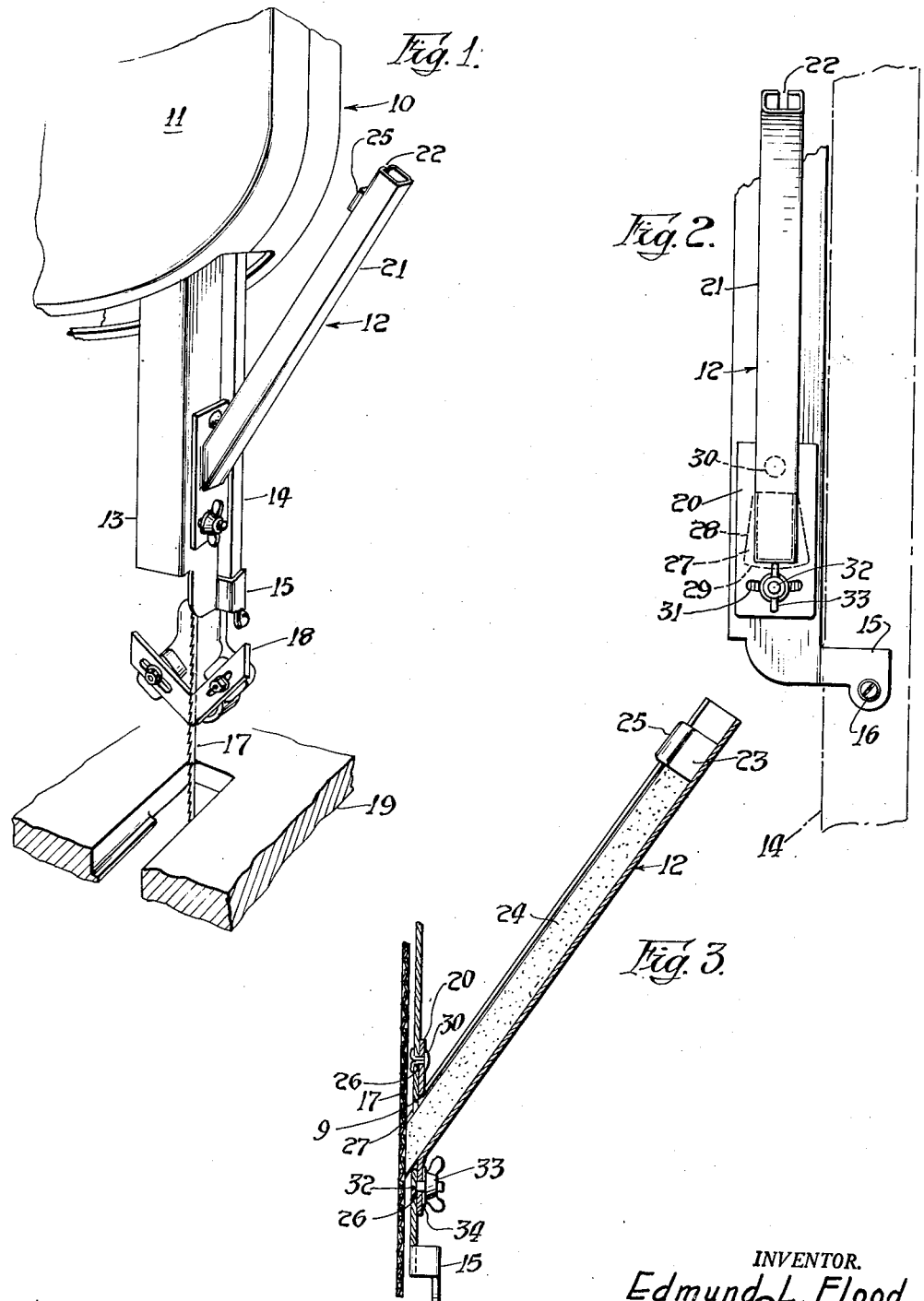
INVENTOR.
Edmund L. Flood
BY Thomas P. Mahoney
Witness:
Enea A. Camporini Patented Nov. 7, 1950

2,529,249

UNITED STATES PATENT OFFICE 2,529,249

SAW LUBRICANT HOLDER

Edmund L. Flood, San Diego, Calif., assignor to Consolidated Vultee Aircraft Corporation, San Diego, Calif., a corporation of Delaware Application July 12, 1946, Serial No. 683,187

3 Claims. (Cl. 143—158)

This invention relates to improvements in lubricant applicators and more particularly to an applicator designed to apply a non-liquid lubricant automatically and continuously to the side of a power-driven saw blade.

In the past, the application of non-liquid lubricants to saw blades of various types has been a rather dangerous and inefficient procedure. Usually, the employee running the saw intermittently applies the lubricant by hand at a point immediately before the saw enters the work piece. Naturally, the juxtaposition of the employee's hand to the running saw blade is fraught with danger and frequently the employee will neglect to lubricate the saw rather than expose himself to the possibility of serious injury.

The intermittent nature of customary hand application of saw lubricants is extremely inefficient because it is desirable that the saw be operated with a film of lubricant on its surface at all times to prevent the overheating and jamming of the saw blade and the discoloration, damaging and warping of the workpiece. Then, too, when the lubricant is applied by hand it is frequently applied to excess in an attempt to cool an overheated blade or to release a jammed workpiece.

Obviously, the hand application of solid lubricants necessitates that small pieces of the lubricant, which could only be applied to the saw blade by bringing the hand uncomfortably close to the blade, be discarded and considered as waste material. Further, hand application of the lubricant permits fragments and crumbs of the lubricant to fall on the workpiece which must be removed when the sawing of the workpiece is completed.

Of greatest moment, however, is the amount of employee time consumed by hand application of lubricants and in removing jammed saws from the workpieces. Of considerable importance, also, is the workpiece which must be discarded because an overheated and dulled saw blade has damaged it beyond repair.

It is, therefore, an object of this invention to provide a lubricant applicator for saw blades which applies the lubricant automatically and continuously to the saw blade as it passes the applicator.

Another object of this invention is the provision of a lubricant applicator for saw blades which will eliminate the dangerous and inefficient practice of hand application.

An additional object of this invention is the provision of an applicator for saw lubricants which applies the lubricant with a minimum of wastage and with a maximum of efficient utilization of the lubricant.

A further object of this invention is the provision of a saw lubricant applicator which embodies adjustable means to insure that the lubricant is brought into contact with the working or cutting edge of the saw.

Another object of this invention is the provision of a saw lubricant container and applicator embodying automatic feed means in constant contact with the lubricant to insure the continual application of the lubricant to the saw blade.

Other objects and advantages of the invention will be made apparent by consulting the specification and claims with the accompanying drawings, in which:

Figure 1 is a perspective view showing a lubricant container and applicator constructed in accordance with this invention mounted on the saw guard of a band saw, Figure 2 is a vertical elevational view showing the adjustable mounting of the saw lubricant container on the saw guard, and Figure 3 is a vertical sectional view showing the way in which the saw lubricant applicator and container brings the lubricant against the saw blade, under pressure of the automatic feed means.

As shown in Figure 1, a band saw 10 embodying a conventional shield 11 which encloses the saw blade wheel (not shown), has associated therewith a saw lubricant applicator and container 12 constructed in accordance with the present invention. Depending from an elongated orifice which runs across the bottom of the shield 11 is a substantially rectangular, elongated saw guard 13 which is firmly secured at its lower end to a standard 14 by means of a right angle flange 15 having a bolt, screw or similar fastening means 16 running through an orifice therein to fixedly secure it to the standard 14. A band saw blade 17 runs through the saw guard 13 and passes therefrom into alignment means 18 which assure the accurate entry of the saw blade 17 into the workpiece (not shown) as it lies upon the slotted work table 19.

The saw lubricant container and applicator 12 embodies a base plate or support 20 which has fixedly or rigidly attached thereto, as by welding, a substantially square or rectangular hollow arm or container means 21 positioned at an acute angle to the base plate 20. Base plate 20 embodies a hole or orifice 9 which is adapted to register with the lower end of the container arm 21 so that the saw lubricant stick may be fed through the base plate 20 into the interior of the saw guard 13. Naturally, the shape of the hollow arm or container 21 will govern the shape of the orifice 9 in the base plate 20. It is understood that the shape of the hollow arm or container 21 ist not necessarily square or rectangular but can be made to conform to the shape of the lubricant stick which is to be inserted within and contained therein. The size of the saw stick or lubricant governs the over-all dimensions of the container arm 21 and the shape of the stick governs the shape of the container arm 21. A slot or cut 22 penetrates the upper wall of the arm 21 and runs downward to a point immediately above the joint at which the arm 21 meets the base plate 20.

Adapted to run up and down within the arm or container 21 is an automatic gravity feed means consisting of a weight 23 which is designed to abut on that end of a saw lubricant stick 24 which is not in contact with the saw blade 17. As the saw lubricant stick 24 is worn away by its lubricating action upon the saw blade 17 the weight 23 continually forces the saw lubricant stick 24 against the working or cutting edge of the blade 17. Since it is desirable that the feeding action of the weight 23 be constant a projection or alignment means 25 on the top of the weight 23 is provided to prevent the inadvertent jamming of the weight against the inner side walls of the arm 21, by the dislocation of the weight 23 within the arm 21. Projection or alignment means 25 is adapted to mate with the slot 22 in the arm 21 and the weight 23 is thus prevented from becoming wedged within the arm 21 of the saw lubricant applicator 12. Thus, the continuous feed of the saw lubricant stick 24 against the saw blade 17 is assured by the constant pressure of the weight 23.

Since the saw guard 13 of conventional saws is not provided with holes adapted to permit the mounting of the saw lubricant container and applicator 12 nor is there embodied in the saw guard 13 an aperture of sufficient dimensions to permit the ingress of the saw lubricant stick 24 into the interior of the saw guard 13 to permit its contacting the working edge of the saw blade 17, holes 26 must be drilled and an aperture or orifice 27 cut in the side of the saw guard 13. The aperture or orifice 27 through which the saw lubricant stick 24 projects into the interior of the saw guard 13 is a polygon having flared out sides 28 and a lower end 29 which is cut on an arc for a purpose to be later described.

The upper end of base plate 20 is pivotally attached to the saw guard 13 as by means of split rivet 30 running through the hole 26 and crimped against the inner wall of the saw guard 13. Immediately below the point where the arm 21 joins the base plate 20 there is cut or otherwise formed in the base plate 20 an arcuate slot 31 whose arc substantially parallels the arc which forms the lower end 29 of the aperture or orifice 27. Positioned upon a bolt 32 which projects through the hole 26 and the arcuate slot 31 is a wing nut 33 which has associated therewith a lock washer 34. The tightening of the wing nut 33 keeps the lubricant container and applicator 12 from moving upon the saw guard 13.

The construction of the arcuate end 29 of the aperture 27 and the arcuate slot 31 in conjunction with its associated wing nut 33 provides an adjustable feature which permits the accurate registry of the saw lubricant stick 24 with the working edge of the saw blade 17 to be made. Therefore, should the working edge of the saw blade 17 be to the right or the left of the end of the saw lubricant stick 24 the untightening of the wing nut 33 permits the lubricant container and applicator to be pivotally shifted so that the end of the saw lubricant stick 24 may be brought into alignment with the working edge of the saw blade 17. The adjustable feature, whose operation has been described above, permits a saw lubricant stick to be utilized with a blade of larger cross section. Since the lubrication of the working or serrated edge of the blade is most critical if, when the lubricant container and applicator 12 has been shifted to bring the saw lubricant stick 24 to the working edge of the saw blade 17, the back portion of the saw is not lubricated it will not interfere with the efficiency of the saw blade 17.

There is thus provided a saw lubricant container and applicator which is adapted to apply lubricant automatically and continuously to the working edge of a moving saw blade. In addition, the container possesses an adjustable feature which permits the use of lubricants whose dimensions do not cover the entire width of the blade.

The embodiment of the invention which has been described in the above specification and shown in the accompanying drawings is described and shown for the purpose of illustrating the method of construction and mode of operation of the invention and it is, of course, understood that changes can be made in the invention which would still fall within the scope of the appended claims.

I claim:

1. Saw blade lubricating means comprising a base plate having an orifice therein, an elongated container means secured at its lower end to said base plate and positioned at an acute angle relative to the base plate and having a stick of solid lubricant therein, said lower end of said elongated container means being juxtaposed to said orifice in said base plate, gravity actuated means movably mounted within said container means and adapted to act upon an end of said stick of solid lubricant automatically to feed the opposite end of said stick from said container means through said orifice in said base plate, said elongated container means having a longitudinally extending slot provided in a wall thereof, and a projecting portion provided on said gravity actuated feed means and extending through said longitudinally extending slot in said container wall and adapted to cooperate with said slot to prevent the dislocation of said gravity actuated feed means within said container means.

2. Saw blade lubricating means comprising a base plate having an orifice therein, means for pivotally mounting said base plate adjacent to a saw blade, means for releasably positioning said base plate in a location to which it has been moved, an elongated container means positioned at an acute angle to said base plate and supported by the base plate and having a stick of solid lubricant therein, said elongated container means being juxtaposed at its lower end to said orifice in said base plate, gravity actuated means movably mounted on said container means and adapted to act upon an end of said stick of solid lubricant automatically to feed the opposite end of said stick from said container means through said orifice in said base plate, and means acting on said gravity actuated feed means to prevent wedging of said feed means within said container means.

3. Saw blade lubricating means comprising a base plate having an orifice therein, means for adjustably mounting said base plate adjacent to a saw blade including a pivot means and a releasable fastener for maintaining said base plate in a location to which it has been moved, an elongated container means positioned at an acute angle to said base plate and supported by the base plate and having a stick of solid lubricant therein, said elonated container means having a longitudinally extending slot provided in a wall thereof and having its lower end juxtaposed to said orifice in said base plate, gravity actuated means movably mounted within said container means and adapted to act upon an end of said stick of solid lubricant automatically to feed the opposite end of said stick from said container means through said orifice in said base plate, and a projecting portion provided by said gravity actuated feed means and extending through said longitudinally extending slot in said container wall and adapted to cooperate with said slot to prevent the dislocation of said gravity actuated feed means within said container means.

EDMUND L. FLOOD.

REFERENCES CITED

The following references are of record in the file of this patent:

UNITED STATES PATENTS

| Number | Name | Date |
|---|---|---|
| 319,624 | Rodebaugh | June 9, 1885 |
| 634,206 | Drake | Oct. 3, 1899 |
| 928,133 | Keighley | July 13, 1909 |
| 1,338,157 | Rains | Apr. 27, 1920 |
| 1,694,153 | Watres | Dec. 4, 1928 |
| 1,960,441 | Huttleston | May 29, 1934 |
| 2,061,315 | Rohwedder | Nov. 17, 1936 |

FOREIGN PATENTS

| Number | Country | Date |
|---|---|---|
| 395,708 | France | Mar. 16, 1909 |
| 547,516 | Great Britain | Aug. 31, 1942 |